(12) United States Patent
Hu et al.

(10) Patent No.: US 8,169,683 B2
(45) Date of Patent: May 1, 2012

(54) OPTICAL SIGNAL GENERATION WITH D/A CONVERTERS AND OPTICAL CLOCK PULSE STREAM

(75) Inventors: Junqiang Hu, Princeton, NJ (US); Yutaka Yano, Tokyo (JP); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 267 days.

(21) Appl. No.: 12/568,767

(22) Filed: Sep. 29, 2009

(65) Prior Publication Data

US 2011/0075242 A1    Mar. 31, 2011

(51) Int. Cl.
*G02F 1/03* (2006.01)
(52) U.S. Cl. ......................................... 359/264; 359/900

(58) Field of Classification Search .................. 359/237, 359/239, 264, 278, 900
See application file for complete search history.

(56) References Cited

U.S. PATENT DOCUMENTS 6,778,310 B2 *   8/2004   Puleo ............................ 359/264

* cited by examiner

*Primary Examiner* — Jack Dinh
(74) *Attorney, Agent, or Firm* — Joseph Kolodka

(57) ABSTRACT

An apparatus includes an optical train pulse generator for generating continuous optical pulses each having a narrow width; a clock source having a high frequency for triggering the generator and operable as a sampling clock; a digital-to-analog converter DAC for converting an input signal from a digital signal processor, the DAC responsive to the sampling clock; a data modulator responsive to an amplified output from the DAC to modulate the continuous optical pulses from the train pulse generator; and a filter for removing higher frequency harmonics from the modulated continuous optical pulses out of the data modulator.

16 Claims, 2 Drawing Sheets

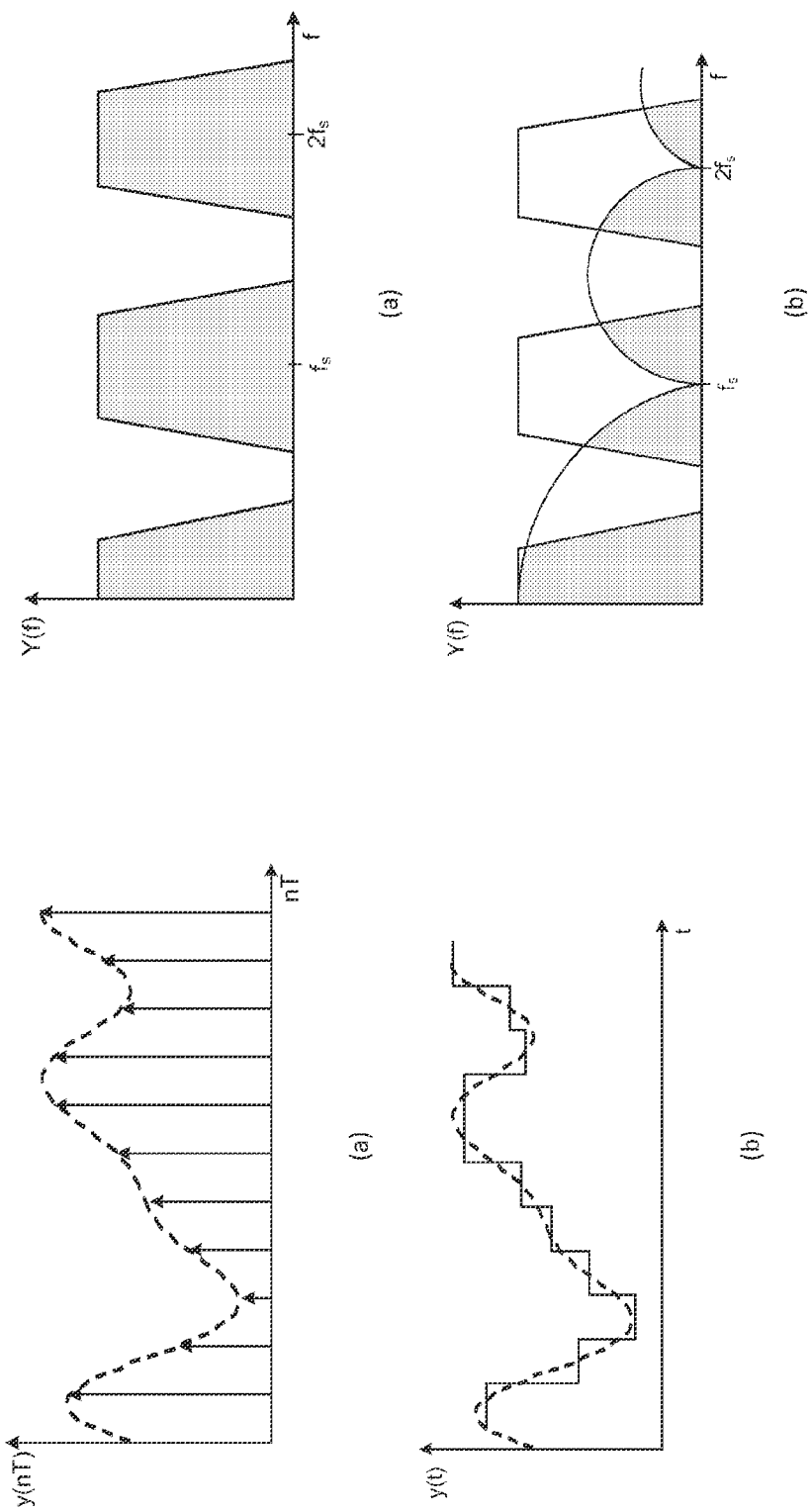

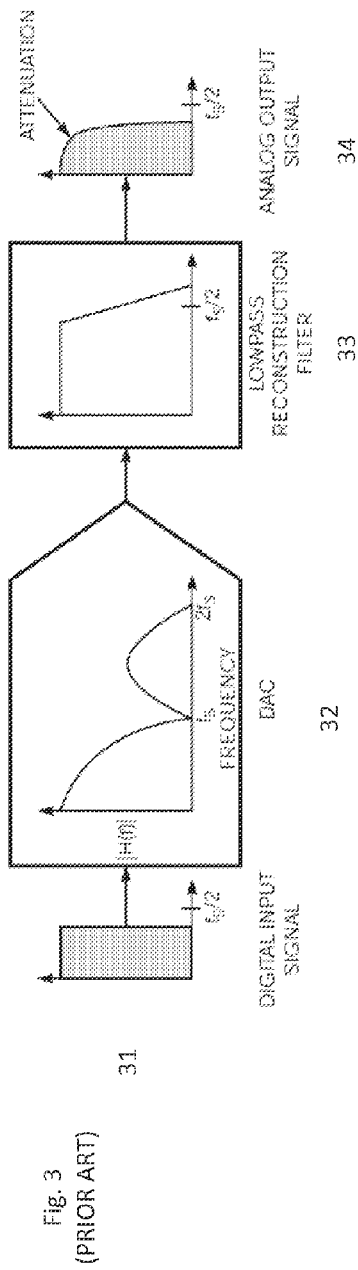
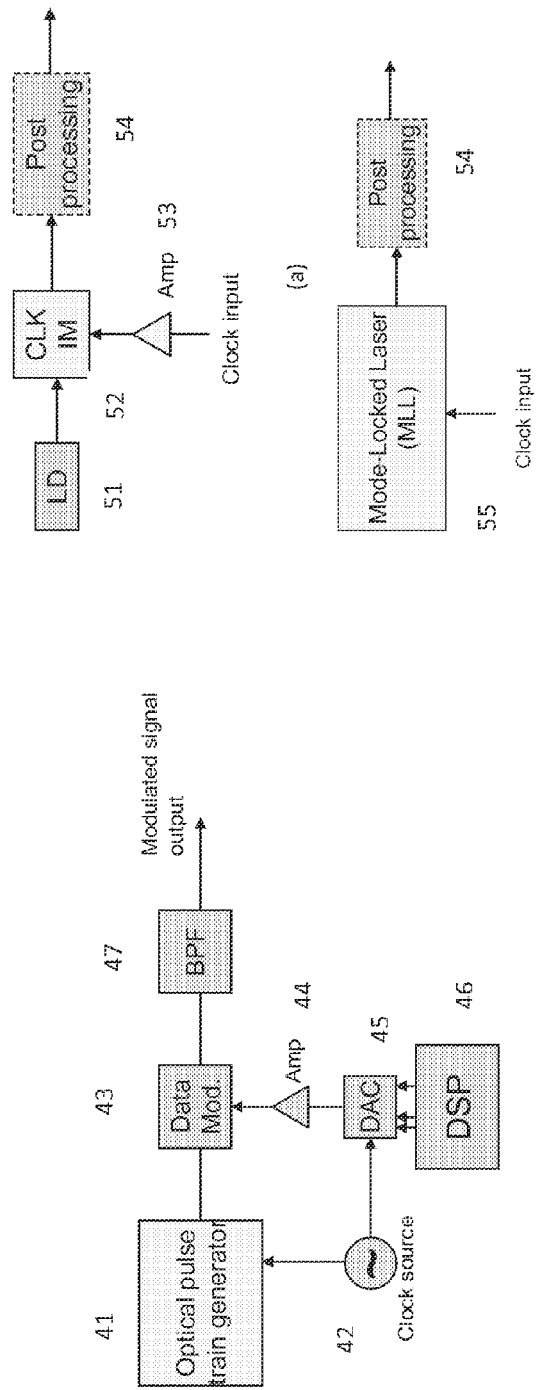

OPTICAL SIGNAL GENERATION WITH D/A CONVERTERS AND OPTICAL CLOCK PULSE STREAM

BACKGROUND OF THE INVENTION

The present invention relates generally to optical systems, and more particularly, to optical digital coherent systems.

Optical signal generation method with DA (Digital to Analog) converters (DAC, in brief) has attracted a lot of interest. For example, OFDM (Orthogonal Frequency Division Multiplexing) over fiber has been proposed as one of the solutions for high-speed communication, such as 40 Gb/s or 100 Gb/s. The key part for OFDM over fiber in the transmitter side is a high-speed DAC to generate the electrical signal, before the optical modulation.

One of the implementation issues is the frequency distortion caused by the conversion speed of the electrical DAC. This is caused by the characteristic of the DAC in that its output has kind of an "output and hold" effect. This effect is illustrated in FIG. 1, where diagram (a) is the discrete signal in digital domain; and diagram (b) is the continuous signal in time domain of the digital signal output to the DAC. The DAC works like a switch: once the switch is open (triggered by its clock edge), the input digital signal is converted to a certain voltage level; after the short open period, it keeps the voltage level. This is the effect we call "output and hold". This effect results in a sine envelope effect in the frequency domain, causing frequency distortion, as illustrated in FIG. 2, where diagram (a) is the expected output spectrum; and diagram (b) is the actual spectrum and the distortion caused by the DAC. Relying on the DAC output characteristics, another type of distortion is also possible, such as an exponential level drop.

Shown in FIG. 3 is a practical DAC sub-system. First the digital input signal 31 passes into the DAC 32. The DAC has a sine envelope frequency response similar to that illustrated in FIG. 2(b). Following the DAC, a low pass filter 33 is applied to reconstruct the signal. We can see from this system that DAC "output and hold" effect results in high-frequency distortion for the generated signal 34. This effect sometime causes unexpected waveform or noise in practical systems.

In general, an over sampling technique is used to avoid the aperture effect due to DA conversion. This is achieved by first interleaving the signals with zeroes inserted in between; then a digital low pass filter is applied to remove the high harmonic frequencies. The signal fed into the DAC is the upsampled signal. To generate very high speed modulation, there is no margin to do so in its conversion speed. So for some applications, people use pre-compensation to compensate the frequency distortion in frequency domain, before feeding the signal to the DAC. This method does not solve the problem completely, and still has some other unexpected effect.

Accordingly, there is a need for overcoming the frequency distortion caused by the conversion speed of the electrical DAC in an OFDM system.

SUMMARY OF THE INVENTION

In accordance with the invention, there is provided an apparatus including an optical train pulse generator for generating continuous optical pulses each having a narrow width; a clock source having a high frequency for triggering the generator and operable as a sampling clock; a digital-to-analog converter DAC for converting an input signal from a digital signal processor, the DAC responsive to the sampling clock; a data modulator responsive to an amplified output from the DAC to modulate the continuous optical pulses from the train pulse generator; and a filter for removing higher frequency harmonics from the modulated continuous optical pulses out of the data modulator.

Preferably, the optical train pulse generator comprises a clock pulse intensity modulator responsive to an amplified clock signal for modulating a continuous wave light source where the clock has narrow high-level, or a mode-locked laser which modulates a clock input, thereby generating optical pulses which are locked to the clock input. The continuous optical pulses from the clock pulse intensity modulator or mode-locked laser are of a narrow enough pulse width sufficient for zero insertion.

In an alternative aspect of the invention, a method includes generating continuous optical pulses each having a narrow width; triggering the generator with a clock source having a high frequency and operable as a sampling clock; converting an input signal from a digital signal processor with a digital-to-analog converter DAC responsive to the sampling clock; modulating the continuous optical pulses responsive to an amplified output from the DAC to provide modulated output pulses; and removing higher frequency harmonics from the modulated optical pulses.

BRIEF DESCRIPTION OF DRAWINGS

These and other advantages of the invention will be apparent to those of ordinary skill in the art by reference to the following detailed description and the accompanying drawings.

FIGS. 1(a) and b) are diagrams illustrating the "output and hold" discussed in the Background of the Invention section of the application.

FIGS. 2(a) and (b) are diagrams illustrating the resulting sine envelope effect in frequency domain, from the "output and hold" effect, causing frequency distortion by the DAC, discussed in the Background of the Invention section of the application.

FIG. 3 is a diagram schematic of a practical DAC sub-system illustrating the high frequency distortion of the generated signal from the "output and hold" effect, discussed in the Background of the Invention section of the application.

FIG. 4 is exemplary system architecture for generating an optical signal, in accordance with the present invention.

FIGS. 5(a) and (b) illustrate methods for generating an optical pulse train, in accordance with the invention.

DETAILED DESCRIPTION

The invention is directed to a method at the electrical-optical EO conversion where, instead of a conventional continuous wave CW light source being used, an optical clock stream is used. The clock is synchronized with a DA converter conversion frequency. Zeros are inserted between the DA output points in optical signal domain.

The basic idea is to modulate the optical "pulse train" instead of modulating a continuous wave (CW) signal. Referring to FIG. 4, there is shown an exemplary architecture illustrating the present invention. First the optical pulse train generator module 41 continuously generates the optical pulses with narrow pulse width. This signal generation is triggered by a high-frequency clock source 42, which also serves as the sampling clock for the high-speed DAC 45. The optical pulse train is fed into the data modulator's 43 optical input port. The data modulator uses the electrical signal (in this case, the DAC converted signal followed by an amplifier 44) to modulate the optical input, and generate the modulated optical output signal. The DAC input is fed by the digital signal processing functional block 46, which processes the signals in digital domain before the DA conversion. A BPF (band-pass filter) 47 follows the data modulator, as the "reconstruction filter" in electrical domain, as shown in FIG. 3, to remove the higher harmonic frequency of the optical signal.

There are at least two possible methods to generate the optical pulse train. One is by modulating the high-speed clock input, as in FIG. 5(a). The LD 51 is a laser diode, which generates a continuous wave optical signal (CW signal). The LD output optical signal is fed into the clock pulse intensity modulator (CLK IM) 52. The clock signal is first amplified 53 and then fed into the electrical input port of the CLK IM 52. A post processing sub-block 54 may be present, if required, to provide an even narrower pulse width. The post processing block, for example, can use a Mach-Zehnder Interferometer (MZI). In another embodiment, the clock input can have a narrow high level that meets the pulse width requirement.

The second solution, as shown in FIG. 5(b), uses a mode-locked laser (MLL) 55. Rather than output the continuous optical signal as in an LD, the MLL modulates the clock input. The MLL outputs the optical pulse train by itself, which is locked to the input clock frequency. Usually the pulse width is narrow enough for the zero insertion. In some cases, the post processing may also present. It is noted that if the BPF is not provided in the optical domain, then when signal converted to electrical, a LPF (low-pass filter) will be required to remove the high frequency harmonics.

As can be seen from the above discussion, instead of using zero insertion in digital domain and then apply a digital filter, this invention uses an optical pulse train as the optical source to achieve the zero insertion in optical domain. A band-pass filter is used following the data modulator to remove the high harmonic frequencies. The invention enables faster operation that is not strictly limited by DA converter speed and relaxes the optical implementation in an optical filter design and tuning point of view.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. An apparatus comprising:
   an optical train pulse generator for generating continuous optical pulses each having a narrow width;
   a clock source having a high frequency for triggering the generator and operable as a sampling clock;
   a digital-to-analog converter DAC for converting an input signal from a digital signal processor, the DAC responsive to the sampling clock;
   a data modulator responsive to an amplified output from the DAC to modulate the continuous optical pulses from the train pulse generator; and
   a filter for removing higher frequency harmonics from the modulated continuous optical pulses out of the data modulator.

2. The apparatus according to claim 1, wherein the optical train pulse generator comprises a clock pulse intensity modulator responsive to an amplified clock signal for modulating a continuous wave light source.

3. The optical apparatus according to claim 2, wherein the optical train pulse generator comprises a post processor for narrowing the pulse width of the optical pulse train from the clock intensity modulator.

4. The optical apparatus according to claim 3, wherein the post processor comprises a Mach-Zhender interferometer.

5. The apparatus according to claim 1, wherein the optical train pulse generator comprises a mode-locked laser which modulates a clock input, thereby generating optical pulses which are locked to the clock input.

6. The apparatus according to claim 5, wherein the continuous optical pulses from the mode-locked laser are of a narrow enough pulse width sufficient for zero insertion.

7. The apparatus according claim 5, wherein the continuous optical pulses from the mode-locked laser require post processing to attain a narrow enough pulse width sufficient for zero insertion.

8. The apparatus according to claim 5, wherein the post processing comprises a Mach-Zhender interferometer.

9. A method comprising:
   generating continuous optical pulses each having a narrow width;
   triggering the generator with a clock source having a high frequency and operable as a sampling clock;
   converting an input signal from a digital signal processor with a digital-to-analog converter DAC responsive to the sampling clock;
   modulating the continuous optical pulses responsive to an amplified output from the DAC to provide modulated output pulses; and
   removing higher frequency harmonics from the modulated optical pulses.

10. The method according to claim 9, wherein the generating of the continuous optical pulses comprises modulating a continuous wave light source by a clock pulse intensity modulator responsive to an amplified clock signal for.

11. The method according to claim 10, wherein the generating of the continuous optical pulses comprises narrowing the pulse width of the optical pulse train from the clock intensity modulator.

12. The method according to claim 11, wherein the narrowing of the pulse width of the continuous optical pulses comprises a Mach-Zhender interferometer.

13. The method according to claim 9, wherein the generating of the continuous optical pulses comprises modulating a clock input thereby generating continuous optical pulses which are locked to the clock input.

14. The method according to claim 13, wherein the continuous optical pulses are of a narrow enough pulse width sufficient for zero insertion.

15. The method according to claim 13, wherein the continuous optical pulses are further modified to attain a narrow enough pulse width sufficient for zero insertion.

16. The method according to claim 13, wherein the further modified comprises applying an interferometer to the continuous optical pulses.

* * * * *